United States Patent [19]
Yamamoto et al.

[11] 4,082,974
[45] Apr. 4, 1978

[54] GAP WINDING TYPE DYNAMO-ELECTRIC MACHINE

[75] Inventors: Hiroe Yamamoto, Tohkai; Noriyoshi Takahashi; Miyoshi Takahashi, both of Hitachi, all of Japan

[73] Assignee: Hitachi, Ltd., Japan

[21] Appl. No.: 680,866

[22] Filed: Apr. 27, 1976

[30] Foreign Application Priority Data

May 12, 1975  Japan .................................. 50-54543

[51] Int. Cl.² .............................................. H02K 1/00
[52] U.S. Cl. ....................................... 310/179; 310/51
[58] Field of Search ................. 310/51, 179, 759, 209, 310/191, 194

[56] References Cited

U.S. PATENT DOCUMENTS

| 3,082,337 | 3/1963 | Horsley | 310/179 |
| 3,546,503 | 12/1970 | Richardson | 310/179 X |
| 3,963,950 | 6/1976 | Watanabe et al. | 310/179 X |

*Primary Examiner*—Donovan F. Duggan
*Attorney, Agent, or Firm*—Craig & Antonelli

[57] ABSTRACT

A gap winding type dynamo-electric machine, in which armature windings are supported in a gap between a rotor and a slotless stator and along the inner periphery of the stator by supporting means carried by the stator such that they are capable of displacement relative to the stator in the circumferential direction or in both circumferential and axial directions, whereby deformation of the armature windings or damage to their insulating layer due to inflow of short-circuit current or sudden change of load is prevented.

20 Claims, 10 Drawing Figures

GAP WINDING TYPE DYNAMO-ELECTRIC MACHINE

BACKGROUND OF THE INVENTION

This invention relates in general to dynamo-electric machines, and more particularly to improvements in gap winding type dynamo-electric machines having armature windings disposed along the inner periphery of a stator core which does not have winding slots.

In the usual dynamo-electric machine, the coils constituting the stator windings are accommodated in slots in the stator core inner periphery. However, to cope with the recent trend to provide dynamo-electric machines having increasing capacity, it is expedient to utilize the so-called gap winding type dynamo-electric machine, which is advantageous in view of its performance and the reduction of size, weight and cost of manufacture associated with such a machine construction.

The gap winding type dynamo-electric machine comprises a stator, a rotor spaced therefrom and electrically insulated armature windings disposed in the air gap between stator and rotor. The armature windings are usually secured to the stator side by suitable fixed support means. With this construction, the outer diameter of the stator core is reduced compared to the conventional dynamo-electric machine having winding slots to an extent coresponding to the depth dimension of the slot, thus permitting reduction of the overall outer diameter dimension of the stator and hence reduction of the weight of the overall machine. An example of such a machine is disclosed in U.S. Pat. No. 3,529,192 granted to Evan John Davies Sept. 15, 1970.

While it is thus advantageous to adopt the gap winding type system, problems can arise in connection with the support of the armature windings on the stator core since the armature windings are disposed along the inner periphery of the slotless stator core as mentioned earlier.

For supporting the armature windings along the inner periphery of the stator core, it has been standard practice to secure the armature windings to a winding support frame which is in turn mounted on the inner side of the stator core, or to secure the armature windings near the opposite ends thereof by support means provided at opposite ends of the stator core. When the armature windings are supported in accordance with these methods, and particularly where the armature windings are secured not to a central portion of the stator core but to the opposite ends thereof, upon sudden change of load or sudden inflow of short-circuit current, the armature winding experiences in the portion thereof corresponding to the central portion of the stator core forces acting in the circumferential direction. These forces give rise to restraining forces since the armature winding is secured at its opposite ends to the opposite ends of the stator core. Thus, often times deformation of the armature winding or damage to the insulation thereof occurs, leading to a serious accident in the extreme case. These support methods are therefore lacking in reliability.

SUMMARY OF THE INVENTION

An object of the invention is to provide a gap winding type dynamo-electric machine, in which the armature windings are supported in such a manner that deformation or damage to their insulation will not be caused even when they experience circumferential forces produced, for example, by a sudden change of their load.

In another aspect, the armature winding undergoes thermal extension or contraction due to the afore-mentioned change of load, thus producing forces tending to displace the opposite ends thereof in the axial direction of the winding.

Another object of the invention, accordingly, is to provide a gap winding type dynamo-electric machine, in which the armature winding is steadily supported in such a way that no stress is produced in it even if it experiences forces tending to displace it both in the circumferential and axial directions, as might occur with a sudden change of its load.

To achieve the above objects of the invention, the armature winding is supported by supporting means, which are mounted on the stator side in such a way that they can be displaced relative to the stator in the circumferential direction.

The supporting means may consist of elastic metal plate members or rigid members mounted on the stator via elastic means, such as springs or lead springs capable of displacement relative to the stator.

In general, the supporting means according to the invention may be of any type so long as the relative displacement between the whole armature winding structure and stator by a certain dimension is permitted. However, supporting means which permit circumferential or axial displacement of only part of the armature winding structure are excluded from the grounds mentioned above in connection with the prior art example.

In a preferred form of the invention, the aforementioned supporting means are provided on a central portion and opposite end portions of the armature winding so as to permit displacement thereof both in circumferential and axial directions. One end of the supporting means is secured to the armature winding structure by means of a wire or rope, including glass fiber impregnated with a thermosetting synthetic resin, for example, an epoxy resin.

By virtue of the afore-mentioned elastic members inserted in the supporting means, the whole armature winding structure can be displaced relative to the stator upon occurrence of a sudden load change and be returned to its initial position when the normal state is recovered.

DETAILED DESCRIPTION OF THE PREFERRED EMBODIMENTS

The invention will now be described in conjunction with some preferred embodiments thereof with reference to the drawings.

Figure 1:
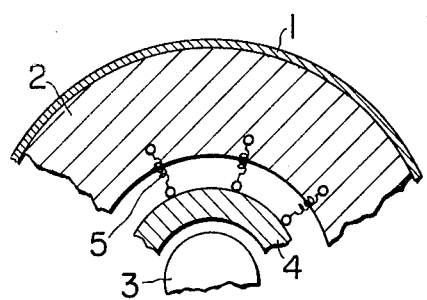
FIGS. 1 and 2 are fragmentary front views illustrating the principles underlying the gap winding type dynamo-electric machine according to the invention.
Figure 2:
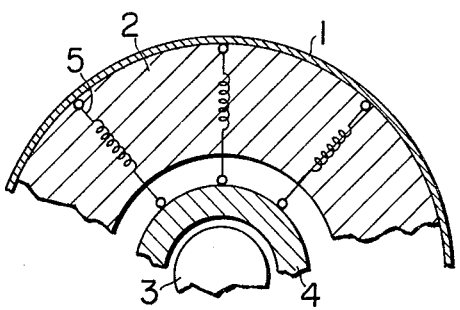
Figure 3:
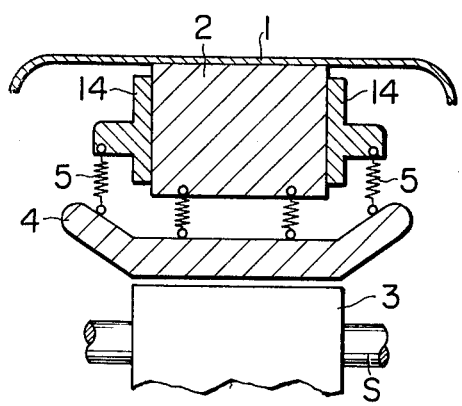
FIG. 3 is a fragmentary axial sectional view of the machine shown in FIG. 1.

The principles underlying the invention will first be discussed with reference to FIGS. 1 to 3. A cylindrical stator housing 1 accommodates an annular stator core 2 secured to its inner periphery and having no winding slots. Disposed within and concentric with the stator core 2 is a rotor 3 mounted on a rotor shaft S. The rotor 2 and stator core 3 face each other and are spaced by a predetermined gap from each other. An armature winding assembly 4 is disposed in the gap between stator core 2 and rotor 3. The armature winding 4 is supported on the side of the stator. The armature winding 4 may be supported by connecting it to supporting means 5 provided on the stator core 2 and also on end plates 14 secured to the opposite ends of the stator core (as shown in FIGS. 1 to 3) or it may be supported by connecting it to supporting means 5 provided on the stator housing 1 (as shown in FIG. 2).

The supporting means 5 may be provided in the form of spring members having elasticity in themselves or rigid members coupled via spring means to the stator core or armature winding so as to permit relative displacement between the armature winding 4 and the stator core 2.

With the above construction, in which the armature winding 4 is suspended within the stator core 2 by supporting means 5 extending therefrom, circumferential forces exerted on the armature 4 can be absorbed through the elastic deformation of the supporting means 5. In other words, since the armature 4 is not supported as a local securement support but is supported for displacement in the circumferential direction by any circumferential forces exerted on it as a result of a sudden load change, thus eliminating the stress concentration in the armature winding 4 and preventing deformation of the armature winding 4 or damage to its insulation.

In another aspect, if the armature 4 is supported as a securement support, thermal elongation of the armature winding 4 caused during the operation of the dynamo-electric machine, which is greatest at the ends of the armature winding, would cause deformation of the armature winding 4 or damage to its insulation because of the restrainment resulting at the supported portions. With the support consisting of or incorporating the afore-mentioned spring members, in contrast, the deformation of the armature winding 4 or damage to its insulation can be prevented owing to the flexiblity of the spring members.

In essence, in accordance with the invention, the armature winding must be supported by suspension from a stationary part in such a way that it can be displaced in the circumferential direction when it is subjected to circumferential forces.

Figure 4:
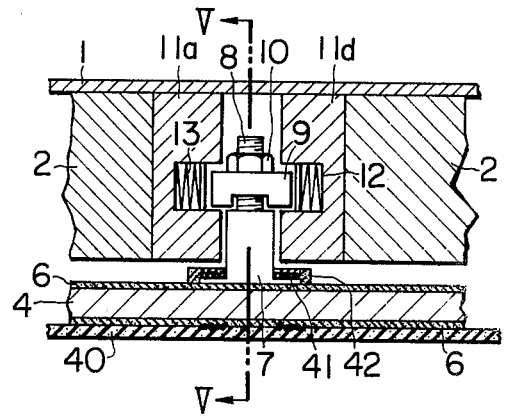
FIG. 4 is a fragmentary axial sectional view showing a central portion of the stator core in a gap winding type dynamo-electric machine according to the invention.
Figure 5:
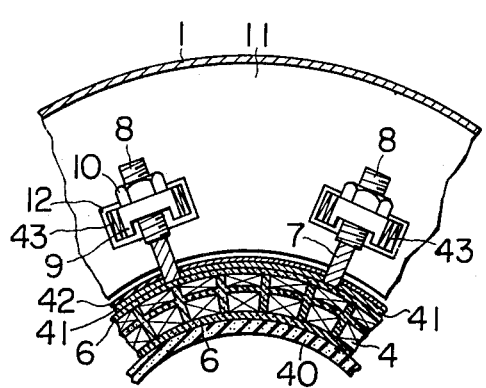
FIG. 5 is a section taken along line V—V in FIG. 4.

A specific embodiment of the invention will now be described with reference to FIGS. 4 to 7. FIGS. 4 and 5 show an arrangement for supporting an armature winding 4 from the central portion of a stator core 2. The armature winding 4 consists of conductive bars covered and enclosed by an insulator 6.

This armature winding 4 is arranged on a cylindrical frame 40 made of an insulating material. A plurality of plate-like support members 7 provided in a circumferential arrangement in the stator core 2 are secured at their end remote from the stator core to the armature winding 4 by means of binding wire 41 and a hardened synthetic resin 42 impregnating the wire 41. A stud 8 extends from the other end of each support member 7 extending within the stator core 2. A slide guide 9 is fitted on the stud 8 and is held in position by a clamp nut 10 screwed on the stud 8. The individual slide guides 9 are disposed in a space defined between two intermediate annular members 11a and 11b inserted in a central portion of the stator core 2 and facing each other. More particularly, each slide guide 9 is received in a cavity 12 defined by the intermediate plates 11a and 11b with a sufficient clearance that it can be displaced within the cavity both in circumferential and axial directions. Also, springs 13 and 43 are disposed in the cavity 12 on opposite sides of the slide guide in the axial and circumferential directions, respectively.

Figure 6:
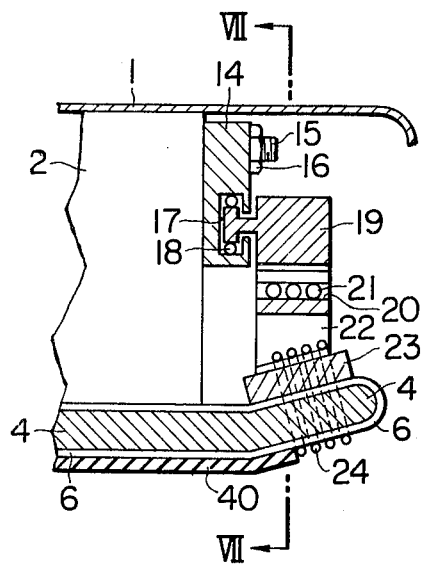
FIG. 6 is a fragmentary axial sectional view showing an end portion of the stator core.
Figure 7:
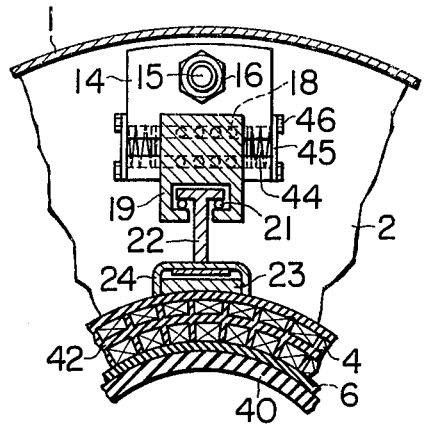
FIG. 7 is a section taken along line VII—VII in FIG. 6.

FIGS. 6 and 7 show an arrangement for supporting the armature winding 4 from opposite ends of the stator core 2. As is shown, a plurality of circumferentially spaced end plates 14 are secured by respective bolts 15 and nuts 16 to the end face of the stator core 2. Each end plate 14 is provided with a circumferential groove 17, in which part of a circumferentially slidable slide guide 19 is received and positioned by slide balls 18. The circumferential groove 17 is closed on both sides of the end plate 14 by annular covers 45 secured to the end plate by screws 46, with covers hold in a pair of springs 44 disposed on either side of the slide guide 19 and which serve to centrally position the slide guide and absorb forces thereon, as will be described in more detail.

The slide guide 19 is also provided with an axial groove 20, in which part of a winding support member 22 is received and positioned by slide balls 21 for movement in the axial direction. The free end of the support member 22 is secured via a buffer member 23 to an end portion of the armature winding covered with an insulator 6 extending axially outwardly of the stator core 2. The securement of the support member 22 to the armature winding 4 is effected, for instance, by binding the securement portion with a winding rope or wire 24 incorporating glass fiber.

With the above construction in which a central portion and opposite end portions of armature windings 4 are supported from corresponding portions of the stator core 2, when the armature winding 4 experiences forces acting in the circumferential direction due to a sudden change in its load, in the central portion of the stator core 2 the slide guides 9 can move within respective cavities 12 defined by the intermediate plates 11a and 11b together with the associated support members 7 secured to the armature winding 4. At this time, the sudden circumferential displacement of the slide guide 9 is damped since the slide guide 9 is urged at its opposite sides in opposite axial directions by the springs 13. Meanwhile, the support members 22 integral with the armature winding 4 experiencing the circumferential forces move the associated slide guides 19 relative to the respective end plates 14 in the circumferential direction. At this time, the slide guide 19 is moved within the associated circumferential groove in the end plate 14 against biasing springs 44, and no further movement takes place.

As has been shown, there is no rigid support of the armature against circumferential displacement; rather, the armature winding 4 can be displaced theoretically to an unlimited extent in the circumferential direction. Besides, the end portions of the armature winding 4 can readily follow the displacement of its central portion. Thus, deformation of the armature winding 4 or damage to its insulation 6 due to local stress concentration can be entirely eliminated.

In addition, with respect to the thermal elongation of the armature winding 4 accompanying the temperature rise during operation, the support members 19 integral with the end portion of the armature winding 4 can be displaced in the axial direction relative to the associated slide guides 19, so that the armature can be held supported without deformation.

Further, the above effects of preventing the deformation of the armature winding 4 and damage to its insulation 6 are obtained even in the case when the circumferential displacement of the armature winding 4 and thermal elongation thereof simultaneously takes place.

Figure 8:
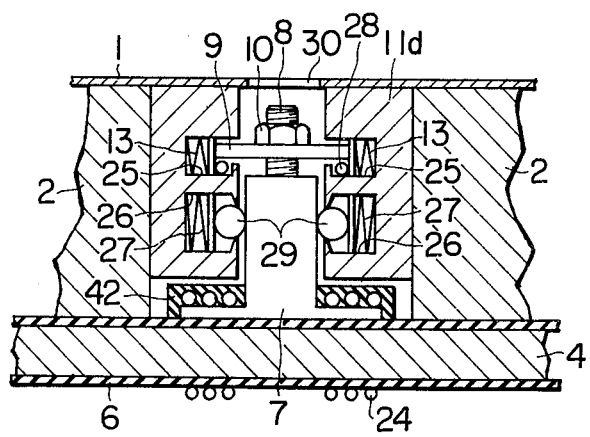
FIG. 8 is a fragmentary axial sectional view showing a central portion of the stator core in another embodiment of the invention.
Figure 9:
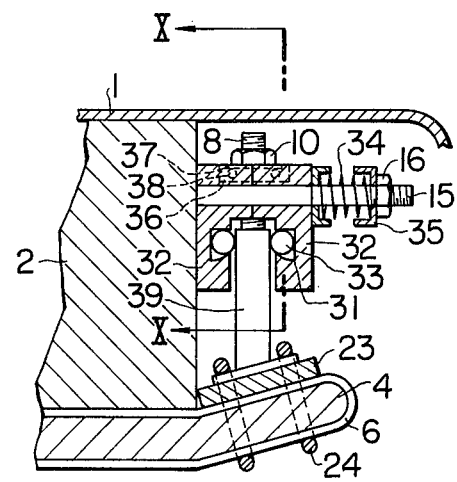
FIG. 9 is a fragmentary axial sectional view showing an end portion of the stator core in accordance with another embodiment of the invention.
Figure 10:
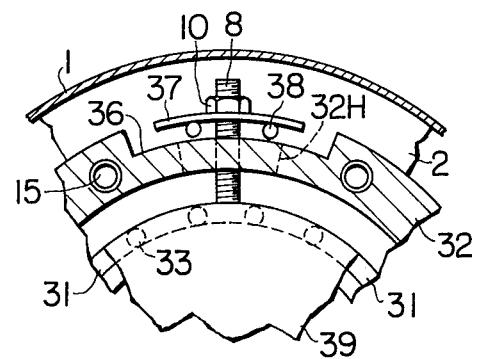
FIG. 10 is a section taken along line X—X in FIG. 9.

FIGS. 8 to 10 show a different embodiment of the invention. FIG. 8 shows a support structure for supporting the armature winding 4 from the central portion of the stator core 2. In this structure, the intermediate plates 11a and 11b are inserted in a central portion of the stator core 2 so as to be spaced from each other and are each formed with two different recesses 25 and 26 in the facing surfaces thereof. Each recess 26 accommodates a spring 27 and a ball 29 for guiding the slide, while each recess 25 accommodates a spring 13 and a ball 28 for supporting the slide. These springs and balls guide a support member 7, that is, the support member 7 is clamped between the guide slide balls 29 received in the respective recesses 26 formed in the intermediate plates 11a and 11b.

The support member 7 is secured at its end to the armature winding 4 by a binding rope 41. A stud 8 extends from the other end of the support member 7, and a slide guide 9 is fitted on the stud 8 and is secured thereto by a nut 10. The slide guide 9 has its opposite end portions extending in the respective recesses 25 formed in the intermediate plates 11a and 11b and riding on the respective support slide balls 28. Designated at 30 is a nut insertion hole formed in the stator housing 1.

Thus, in the central portion of the stator core the support members 7 secured to the armature winding 4 can be displaced relative to the stator core in the circumferential direction, the springs 27 and 13 respectively exerting clamping forces on the support member 7 and slide guide 9 serve to damp any sudden circumferential displacement of the support member 9.

FIGS. 9 and 10 show a structure for supporting the ends of the armature winding 4 from the ends of the stator core 2. A ring guide 32 formed with circumferential grooves circumferentially spaced from one another is coupled by studs 15 and nuts 16 to each end face of the stator core 2. A gap damper 35 and a spring 34 are fitted together with the nut 16 on each stud 15 so as to bias the ring guide 32 against the stator core 2, that is, the ring guide 32 is mounted so as to be slidable along the studs 15. Received in each circumferential groove 31 formed in the ring guide 32 is a support member 39 which is secured at its opposite end via a buffer member 23 to the armature winding 4. Within the circumferential groove 31 the support member 39 is clamped between circumferentially slidable balls 33 for displacement in the circumferential direction. A stud 8 extends from the end of each support member 39 remote from the armature winding 4 and penetrates a hole 324 the ring guide 32 in the radial direction. A washer 37 is fitted on the stud 8 and is secured to it by a nut 10. Further, slide balls 38 intervene between the washer 37 and ring guide 32 to facilitate the circumferential displacement of the assembly.

With this construction, displacement of the armature winding in the circumferential direction can be followed by the circumferential displacement of the support member 39 and washer 37 along the track of the balls 33 and 38, while the thermal elongation of the armature winding 4 can be followed by the axial displacement of the ring guide 32 along the studs 15.

Thus, rigid point support can be avoided with respect to either circumferential or axial displacing forces to eliminate stress concentration in the armature winding 4, thus preventing deformation of the armature winding or damage to its insulation.

As has been described in the foregoing, according to the invention the armature winding is supported in a gap between the rotor and stator from the side of the stator such that it is capable of displacement relative to the stator both in the circumferential and axial directions, so that forces exerted on the armature windings in the circumferential and axial directions can be taken up by the displacement of the whole armature winding structure in the corresponding directions. Thus, it is possible to provide a gap winding type dynamo-electric machine, in which the armature windings are steadily supported so as to eliminate deformation of the armature windings or damage to the insulation of the windings that have hitherto resulted due to rigid point support restricting the circumferential displacement and elongation of the armature windings.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A gap winding type dynamo-electric machine comprising a rotor mounted on a rotatably supported shaft, a slotless annular stator concentrically surrounding said rotor and being spaced therefrom to form an annular gap with the outer periphery of said rotor, and an armature winding located in said annular gap along the inner periphery of said stator, support means for supporting said armature winding from said stator while permitting displacement of said armature winding relative to said stator in the circumferential direction; wherein said support means includes support members provided at circumferentially spaced positions in an axially central portion and opposite end portions of said stator; and wherein each support member of said supporting means is directly secured at one end to said armature winding and supported at the other end by said stator via an elastic member.

2. A gap winding type dynamo-electric machine comprising a rotor mounted on a rotatably supported shaft, a slotless annular stator concentrically surrounding said rotor and being spaced therefrom to form an annular gap with the outer periphery of said rotor, and an armature winding located in said annular gap along the inner periphery of said stator, supporting means for supporting said armature winding from said stator while permitting displacement of said armature winding relative to said stator in the circumferential direction, said annular stator is provided with an annular space in the axially central portion thereof concentric with said rotor, said supporting means comprising a plurality of support members secured to said armature winding at one end thereof and engaging in said annular space and supported by said stator at the other end thereof for movement in the circumferential direction along said annular space.

3. A gap winding type dynamo-electric machine comprising a rotor mounted on a rotatably supported shaft, a slotless annular stator concentrically surrounding said rotor and being spaced therefrom to form an annular gap with the outer periphery of said rotor, and an armature winding located in said annular gap along the inner periphery of said stator, support means for supporting said armature winding from said stator while permitting displacement of said armature winding relative to said stator in the circumferential direction; wherein said annular stator is provided with an annular space in the axially central portion thereof concentric with said rotor, said support means comprising a plurality of support members secured to said armature winding at one end thereof and engaging in said annular space at the other end thereof for movement in the circumferential direction along said annular space; and wherein said support members are elongated plate-like members.

4. A gap winding type dynamo-electric machine comprising a rotor mounted on a rotatably supported shaft, a slotless annular stator concentrically surrounding said rotor and being spaced therefrom to form an annular gap with the outer periphery of said rotor, and an armature winding located in said annular gap along the inner periphery of said stator, support means for supporting said armature winding from said stator while permitting displacement of said armature winding relative to said stator in the circumferential direction; wherein said annular stator is provided with an annular space in the axially central portion thereof concentric with said rotor, said support means comprising a plurality of support members secured to said armature winding at one end thereof and engaging in said annular space at the other end thereof for movement in the circumferential direction along said annular space; and wherein said annular space in said stator includes an enlarged portion providing an annular track, each support member having a slide guide secured to the end thereof in said annular space and riding on said track.

5. The gap winding type dynamo-electric machine according to claim 4 wherein the enlarged portion of said annular space forms a cavity which is sufficiently larger than said slide guides to permit movement of said armature winding in the axial direction.

6. The gap winding type dynamo-electric machine according to claim 5 further including a plurality of spring members disposed in said cavity between the walls thereof and said slide guides.

7. The gap winding type dynamo-electric machine according to claim 5 wherein said slide guides are adjustable as to position along at least a portion of said support member.

8. A gap winding type dynamo-electric machine comprising a rotor mounted on a rotatably supported shaft, a slotless annular stator concentrically surrounding said rotor and being spaced therefrom to form an annular gap with the outer periphery of said rotor, and an armature winding located in said annular gap along the inner periphery of said stator, support means for supporting said armature winding from said stator while permitting displacement of said armature winding relative to said stator in the circumferential direction; wherein said annular stator is provided with an annular space in the axially central portion thereof concentric with the rotor, said support means comprising a plurality of support members secured to said armature winding at one end thereof and engaging in said annular space at the other end thereof for movement in the circumferential direction along said annular space; and wherein said annular space in said stator includes a pair of radially spaced enlarged portions forming first and second cavities, each support member having a slide guide secured to the end thereof in said annular space and riding in a track in the first cavity, and guide means in said second cavity for guiding said support member.

9. A gap winding type dynamo-electric machine comprising a rotor mounted on a rotatably supported shaft, a slotless annular stator concentrically surrounding said rotor and being spaced therefrom to form an annular gap with the outer periphery of said rotor, and an armature winding located in said annular gap along the inner periphery of said stator, support means for supporting said armature winding from said stator while permitting displacement of said armature winding relative to said stator in the circumferential direction; wherein said support means includes end plates fastened to the sides of said stator adjacent the end portions of said armature winding and support members secured to said armature winding at one end thereof and being coupled to respective end plates so as to permit circumferential movement thereof in said end plates.

10. The gap winding type dynamo-electric machine according to claim 9 wherein said end plates are provided with a circumferential groove in one surface thereof and said support member is provided with a projecting portion engaging in said circumferential groove.

11. The gap-winding type dynamo-electric machine according to claim 10, further including means enclosing the ends of said circumferential groove in each end plate and spring members disposed in said groove on either side of said projecting portion of said support member.

12. The gap winding type dynamo-electric machine according to claim 11 wherein said support member is formed by first and second members coupled together to permit relative movement therebetween in the axial direction of said rotor.

13. The gap winding type dynamo-electric machine according to claim 9 wherein said end plates are each provided with a hole through which a support member extends, and a washer secured to the end of said support member which extends through said hole, said hole being dimensioned to permit movement of said support member and the armature winding connected thereto in the circumferential direction.

14. The gap winding type dynamo-electric machine according to claim 13 wherein said end plates are resiliently fastened to said stator to permit movement of said end plates in the axial direction of said rotor.

15. A gap winding type dynamo-electric machine comprising a rotor mounted on a rotatably supported shaft, a slotless annular stator concentrically surrounding said rotor and being spaced therefrom to form an annular gap with the outer periphery of said rotor, an armature winding located in said annular gap along the inner periphery of said stator, and supporting means for supporting said armature winding from said stator while permitting displacement of said armature winding relative to said stator in both the circumferential and axial directions, said supporting means including support members secured at one end to said armature windings and supported at the other end by said stator.

16. The gap winding type dynamo-electric machine according to claim 15 wherein support members are provided on an axially central portion and opposite end portions of said stator.

17. The gap winding type dynamo-electric machine according to claim 10 wherein each support member includes an elastic member having one end secured to said armature windings and the other end supported by said stator.

18. The gap winding type dynamo-electric machine according to claim 10 wherein each support member consists of a rigid member having one end secured to said armature and the other end supported by said stator via an elastic member.

19. The gap winding type dynamo-electric machine according to claim 15 wherein said support members are provided at circumferentiallly spaced positions in an axially central portion and opposite end portions of said stator.

20. The gap winding type dynamo-electric machine accrding to claim 19 wherein each support member is directly secured at one end to said armature windings and supported at the other end by said stator via an elastic member.

* * * * *